United States Patent [19]
Buck et al.

[11] Patent Number: 5,256,884
[45] Date of Patent: Oct. 26, 1993

[54] METHOD AND APPARATUS FOR THE ALIGNMENT OF PAPER STACKS IN A PRINTING PRESS BY OPTICAL BEAMS REFLECTED THEREFROM

[75] Inventors: Helmut Buck, Schriesheim; Ludwig Bergann, Berlin, both of Fed. Rep. of Germany

[73] Assignee: Heidelberger Druckmaschinen A.G., Heidelberg, Fed. Rep. of Germany

[21] Appl. No.: 857,517

[22] Filed: Mar. 25, 1992

[30] Foreign Application Priority Data

Mar. 25, 1991 [DE] Fed. Rep. of Germany ....... 4110187
Sep. 6, 1991 [DE] Fed. Rep. of Germany ....... 4129702

[51] Int. Cl.$^5$ ............................................. G01N 21/86
[52] U.S. Cl. ......................................... 250/561; 356/1
[58] Field of Search ................... 250/560, 561, 201.4, 250/548; 356/1, 4, 375, 376

[56] References Cited

U.S. PATENT DOCUMENTS

| | | | |
|---|---|---|---|
| 4,266,875 | 5/1981 | Bodlaj | 356/1 |
| 4,839,526 | 6/1989 | Pryor | 250/561 |
| 4,847,510 | 7/1989 | Douglas | 250/561 |
| 4,874,956 | 10/1989 | Kato et al. | 250/561 |
| 4,916,302 | 4/1990 | Sorimachi | 250/561 |

FOREIGN PATENT DOCUMENTS 0405423 1/1991 European Pat. Off. .
2219709 12/1989 United Kingdom .

Primary Examiner—David C. Nelms
Attorney, Agent, or Firm—Nils H. Ljungman

[57] ABSTRACT

A method and apparatus for the alignment of paper stacks in a printing press provides essentially uninterrupted printing through the transfer of supply of sheets of paper from a first stack of papers to a second stack of papers by reducing mechanical strain in the control and operation of the sheet feeder of the printing press.

19 Claims, 5 Drawing Sheets

5,256,884

METHOD AND APPARATUS FOR THE ALIGNMENT OF PAPER STACKS IN A PRINTING PRESS BY OPTICAL BEAMS REFLECTED THEREFROM

BACKGROUND OF THE INVENTION

1. Field of the Invention

The invention relates to a method and an apparatus for the alignment of paper stacks in a printing press to provide a minimum amount of strain to the control and operation of the sheet feeding function of the printing press.

2. Background Information

In the printing industry, there is often a need for printing a large number of items. In order to do so, it can be beneficial if the supply of paper to the printing press is essentially continuous, thereby providing essentially little down time for the operation of the press. For the printing press to operate successfully during the transfer of the paper supply from a first stack to a second, it can be beneficial to the operation if the last sheet of the stack being used is substantially aligned with the first sheet of the next stack to be used. Thus, there would essentially be very little, to preferably no lateral offset between the last sheet of the first stack and the first sheet of the next stack to be used. Any amount of lateral offset could possibly strain the regulation and control of the printing machine, and could even result in a paper jam, especially if the lateral offset is severe.

In order to compensate for any problems which might occur in the transfer of sheet delivery from one stack to another, it is preferable that the stacks be substantially aligned so that lateral position of the last sheet of the stack being used is essentially aligned with the lateral position of the first sheet in the next stack, thereby providing a relatively small amount of lateral offset between the paper stacks so that little or no strain results in the regulation and control of the machine.

A known method for aligning paper stacks on a printing press includes exposing the paper stacks to optical light by means of a transmitter, and then evaluating the angular correlation of the rays of light reflected from the stacks. The reflected light rays can be detected by a sensor with a position-sensitive, photo-receiving arrangement.

In the alignment of paper stacks, as well as in several other cases of distance or positional measurement of objects, it is not so much the absolute distance that is of interest, but rather the relative position, for example, of two objects relative to each other, i.e. the position of one paper stack relative to the position of another paper stack which will be used to replace the first stack.

This is typically the case in a variety of different industries, for example, with positioning and follow-up tasks in the steel industry, with packaging machines in the paper and printing industry, and in the building industry, etc. For example, in the printing industry, as discussed above, during the operation of a printing machine, a new paper stack often needs to be aligned with, and then united with an auxiliary paper stack to replenish the paper supply. To achieve this, the relative position of both stacks must be measured to position the new paper stack in alignment with the auxiliary stack that is being used.

For such tasks, known optical triangulation sensors and control elements can be used, whereby the relative position of any two objects can be determined from the difference values between the output signals received by two such sensors. With such a procedure, there is a definite disadvantage that measuring errors which independently occur in both sensors can multiply considerably, so that in some circumstances the use of such a measuring method with two sensors may become essentially impossible. A precise uniformity of the characteristic curves and a low degree of drifting or wear of such devices must especially be demanded. Such precision makes these devices very expensive, and in many cases they can reach their physical limits.

OBJECT OF THE INVENTION

It is an object of this invention to create a measuring method and device whereby the relative distance between two objects, such as the paper stacks on a printing press, can be accurately detected in an optical way, largely independent of the absolute distance of both objects from the measuring device, so that a simple and accurate joining of both objects can be achieved.

A further objective is to achieve this distance measurement with considerably less expenditure than with the use of two known distance sensors and furthermore with a greater accuracy in determining any distance differences.

SUMMARY OF THE INVENTION

These objects are achieved with a method and device for optically measuring the distance of objects from each other by means of optical triangulation.

According to the invention, this object is achieved by essentially combining at least two triangulation sensors into a single device. In so doing, the distance measurement of each of the objects being measured preferably takes place with one transmitter light beam for each of the objects, while the position determination is preferably carried out with only one position-sensitive system. To achieve this, the paths of the rays of light on the receiver side of the objects are directed via mirrors, such that the paths of light reflected from each of the objects essentially lead to one and the same position-sensitive receiver arrangement. The position-sensitive receiver arrangement can preferably either be designed as a double diode arrangement, PSD (position-sensitive detector), or as a CCD-line (charge coupled device).

The coordination of the measuring values of each object being detected is preferably accomplished by alternatingly illuminating the objects with the light transmitter and synchronously transmitting the respective measuring values to a difference generator by means of a synchronous demodulator. Thereby, the output of a highly accurate difference signal, corresponding to distance, in addition to the distance measurement signals of the objects is possible. Since only one electronic measuring channel is used, any measurement errors, such as those due to differing non-linear characteristic curves and thermal or wear related drifting, which errors are typically prevalent in known measurement devices, are largely eliminated. In addition, errors caused by mechanical instabilities due to optical build-up can be kept at a minimum through a suitable selection of design and materials.

Other types of errors which could be caused by changes in the degree of reflectance of the objects, differing transmission of the optical paths (soiling, blinding of optical surfaces, loss in capacity of the transmitters) can also essentially be reduced or eliminated by the evaluation of the received signals with one single measuring channel, or quotient-forming channel.

In addition to the mentioned technical advantages, the solution according to the present invention also offers economic advantages, as compared to other devices which utilize two separate optical distance sensors. Thus, the investment in electronics is cut almost in half while the measuring accuracy is improved considerably, and, essentially only four low-cost surface mirrors are added as additional optical components.

With the device, according to the present invention, for carrying out the method of the present invention, a simple design of the sensor unit is essentially achieved. This design generates only one corrective signal that can be used immediately for the positioning of the objects to be joined, or aligned. Particularly with the joining of two stacks of paper in a processing machine, for instance, a precise positioning of the two stacks relative to each other can be achieved, whereby a trouble-free operation of the machine can essentially be assured with essentially no inaccuracies occurring in the process.

In summary, one feature of the invention resides broadly in a method for aligning paper stacks in a printing press, the printing press comprising a device for holding a first stack of paper for supplying sheets of paper to the printing press, a device for holding at least one additional stack of paper for replacing the first stack of paper, and a device for moving the at least one additional stack of paper relative to the first stack of paper to align the at least one additional stack of paper with the first stack of paper. The method comprises the steps of, directing a beam onto each of the first stack of paper and the at least one additional stack of paper, reflecting the beam off of each of the first stack of paper and the at least one additional stack of paper, directing the reflected beam from each of the first stack of paper and the at least one additional stack of paper onto a single detector device, the detector device comprising a position sensitive receiver for detecting the reflected beams, detecting each of the reflected beams with the detector device, generating a signal with the detector device, the signal corresponding to the relative position of the first stack of paper and the at least one additional stack of paper; and moving the at least one additional stack of paper with the device for moving in response to the signal to align the at least one additional stack of paper with the first stack of paper.

An additional feature of the invention resides broadly in a method for measuring the distance of objects, the method comprising the steps of: directing a light beam onto each of a first object and at least one additional object; reflecting the light beam off of each of the first object and the at least one additional object; directing the reflected light beam from each of the first object and the at least one additional object onto a single detector device, the detector device comprising a position sensitive receiver for detecting the reflected light beams; detecting each of the reflected light beams with the detector device; and generating a signal with the detector device, the signal corresponding to the distance of the first and the at least one additional object from the detector device.

Another additional feature of the invention resides broadly in an apparatus for measuring the distance to at least two objects by optical triangulation, the apparatus comprising: a device for irradiating each of the at least two objects with a light beam, the light beam for irradiating each of the at least two objects being reflected off of each of the at least two objects; a single detector device for detecting the reflected light beam from each of the at least two objects, the detector device comprising a position sensitive receiver arrangement for detecting each of the reflected light beams; an apparatus for directing each of the reflected light beams from each of the at least two objects onto the single detector device; and the single detector device comprises apparatus for generating a signal, the signal for corresponding to the distance of each of the at least two objects from the detector device.

BRIEF DESCRIPTION OF THE DRAWINGS

The invention will now be described with relation to the accompanying drawings, in which.

DESCRIPTION OF THE PREFERRED EMBODIMENTS

Figure 1:
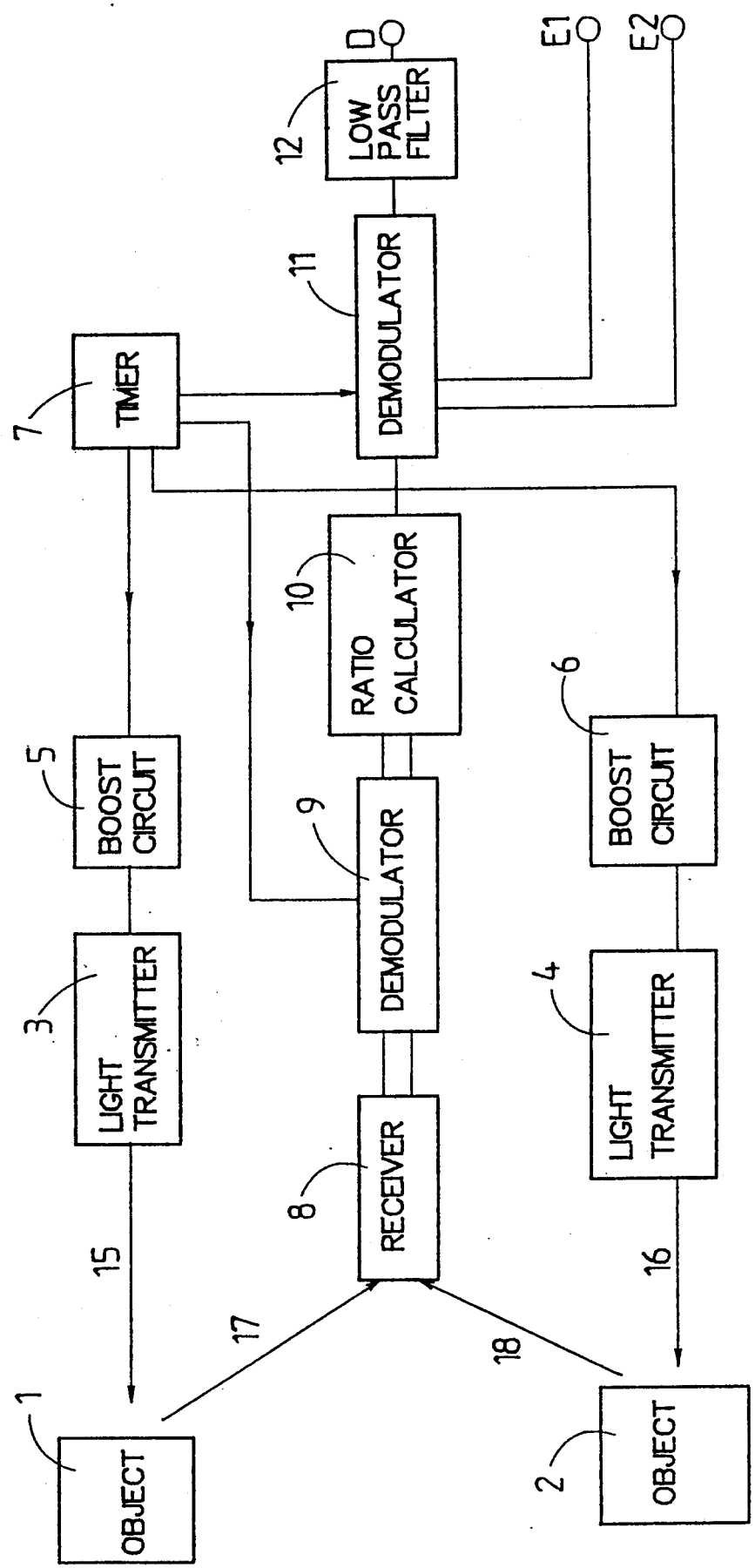
FIG. 1 is a schematic illustration showing the working principle of the signal processing according to the present invention.
Figure 1A:
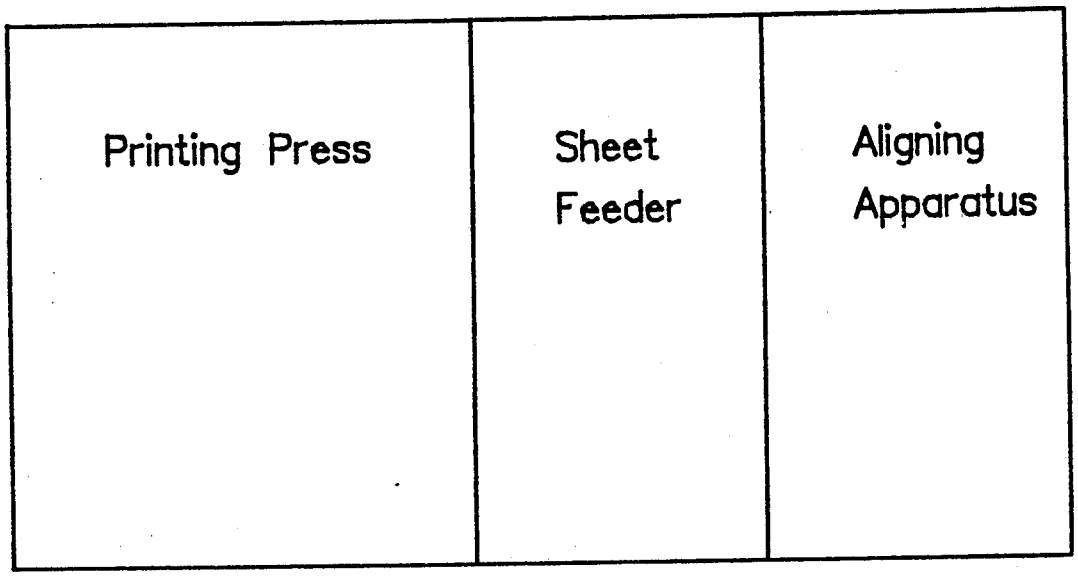
FIG. 1a shows a schematic illustration of a printing press having an aligning apparatus for aligning paper stacks.

FIG. 1a shows a schematic illustration of a printing press having a sheet feeder and an aligning apparatus, wherein the aligning apparatus is for aligning a new, additional paper supply stack with a paper supply stack which is already being used to supply sheets of paper to the printing press. This aligning device is described in more detail herebelow with reference to the remaining figures.

As shown in FIG. 1, the aligning apparatus preferably has light transmitters 3, 4 which can preferably be assigned to the two objects 1 and 2, the relative position of which are being measured. The light transmitters 3, 4 can preferably be semiconductor emitters, LED's, IRED's or laser diodes, wherein LED and IRED may be light emitting diodes and infra red emitting diodes, respectively. The light transmitters are preferably triggered in periodic alternation by a timing circuit 7 through boost circuits 5, 6. These light transmitters 3, 4 preferable each emit a light beam 15, 16, respectively, which light beams 15, 16, in turn, can be received by a receiver 8 as signals 17, 18 as position indicative signals for each of the objects 1, 2 being measured. The two light transmitters 3, 4 are preferably triggered in periodic alternation via boost circuits 5, 6, and a timer 7 preferably generates the timing for triggering the periodic alternation of the boost circuits.

Subsequent to the receiver 8 there are preferably arranged, an amplifier and a synchronous demodulator 9, as well as a ratio calculator 10 for the suppression of extraneous light, transmitter wear, variations in diffuse reflectance and soiling, as well as for equalizing the characteristic curves. These components can generally equally work on both signals 17, 18, so that the drifting behavior of the components is essentially compensated. The subsequent synchronous demodulator 11 is preferably controlled by the transmitter switching pulse generator, and the output voltage of the demodulator 11 essentially corresponds to the difference between individual distance signal voltages E1 and E2. A low pass filter 12 can serve to suppress the transmitter switching pulse generator in the difference signal voltage D.

Figure 2:
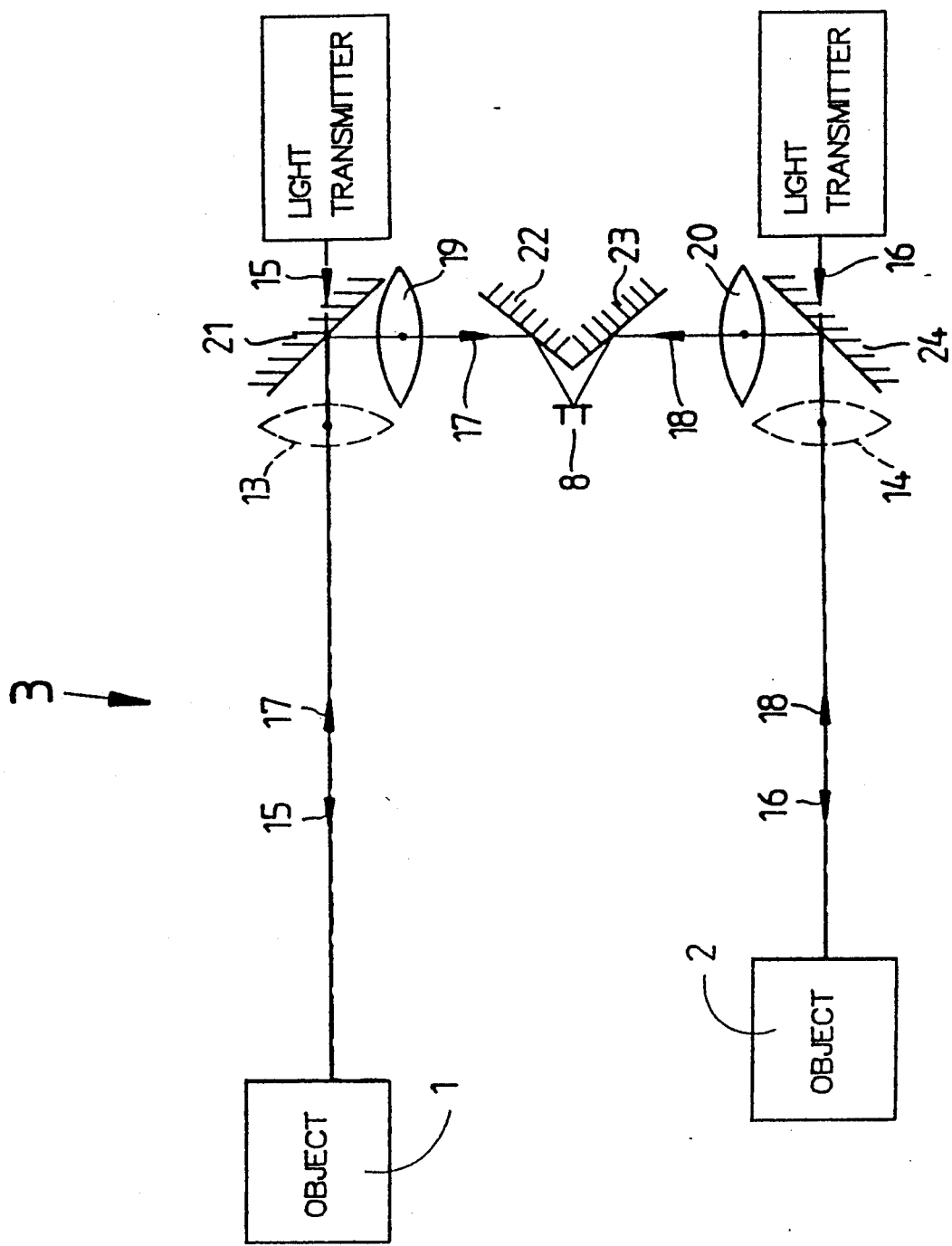
FIG. 2 is a more detailed schematic of the signal processing.
Figure 3:
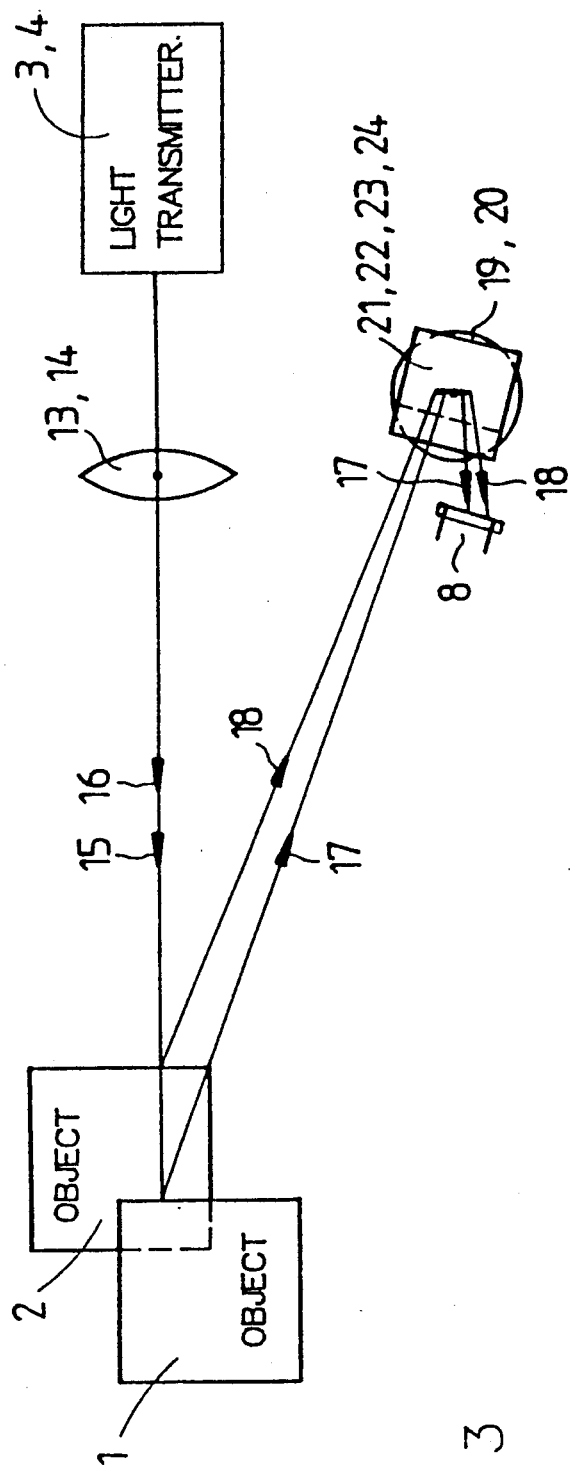
FIG. 3 shows a view of the schematic of FIG. 2 rotated 90°, which view shows the triangulation plane of the signal processing.

FIG. 2 shows a preferred configuration of the mirrors 21, 22, 23, 24, and the path of travel of the beams 15, 16, 17, 18 in the plane of FIG. 2. The receiving signal beams 17 and 18, which are preferably focused by lenses 13, 14, 19, 20, and deflected by mirrors 21, 24, are directed onto the plane of the receiver 8 by means of the mirror arrangement 22, 23, whereas with variation of the object distance in the drawing plane of FIG. 3, the signal beams 17, 18 can be found at different locations along the longitudinal axis of the receiver 8. Therefore, the focal points of the images are the different points on the longitudinal axis of the receiver 8, depending on the distance of the objects 1, 2 (FIG. 3). The objects 1, 2 will tend to produce different signals at the receiver outputs in accordance with any position differences between the two objects.

The different signals from each of the objects are subjected to signal processing for the purpose of receiving only one signal at the output. The one signal can be in either analog or digital form, and is proportional to the distance difference of the objects being sensed.

In a further embodiment of the evaluation system, certain components of the processing electronics, particularly components 7, 9, 10, 11 and 12, can be replaced by a microprocessor control. Such a microprocessor control would digitally process the signal values and would essentially reduce stable residual errors further through a learning phase. This learning phase could preferably take place at start-up, and for example, during the learning phase, special system parameters could be stored on ROM (read only memory). The measured value D is then preferably available directly as a digital equivalence.

One possible mode of operation of such a measuring system would be as follows: a light beam is directed onto each of the objects being measured; the reflected light beams are directed onto the detector and impinge the detector at two different points on the detector if the objects are out of alignment; a signal is generated with respect to the difference in the location of the impinging points of the light beams on the detector; and one object is moved with respect to the other object until the impinging points of each of the light beams essentially correspond to one another at the same location on the detector. It is preferable that one of the objects be used as a reference source the position of which is known, and the other object be moved with respect to the reference object until the impinging points of the both of the objects essentially are the same on the detector, thereby indicating that both objects are aligned.

Figure 4:
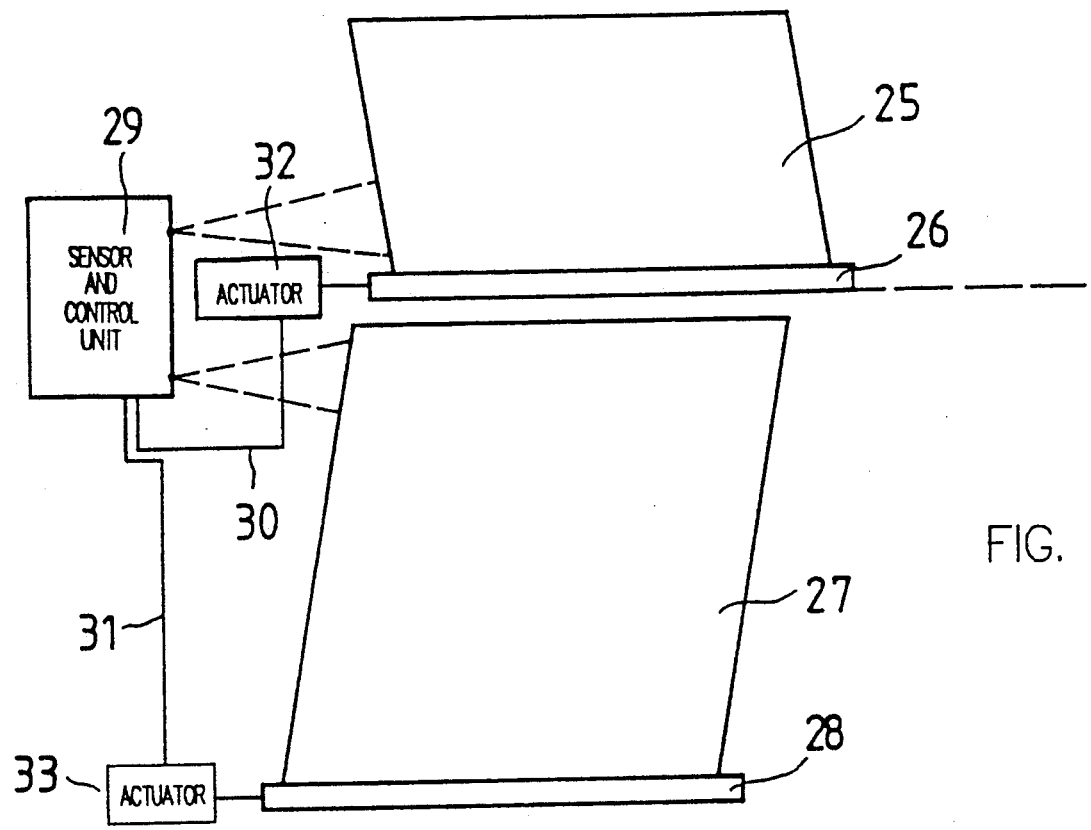
FIGS. 4 and 5 show devices for carrying out the method according to the present invention.
Figure 5:
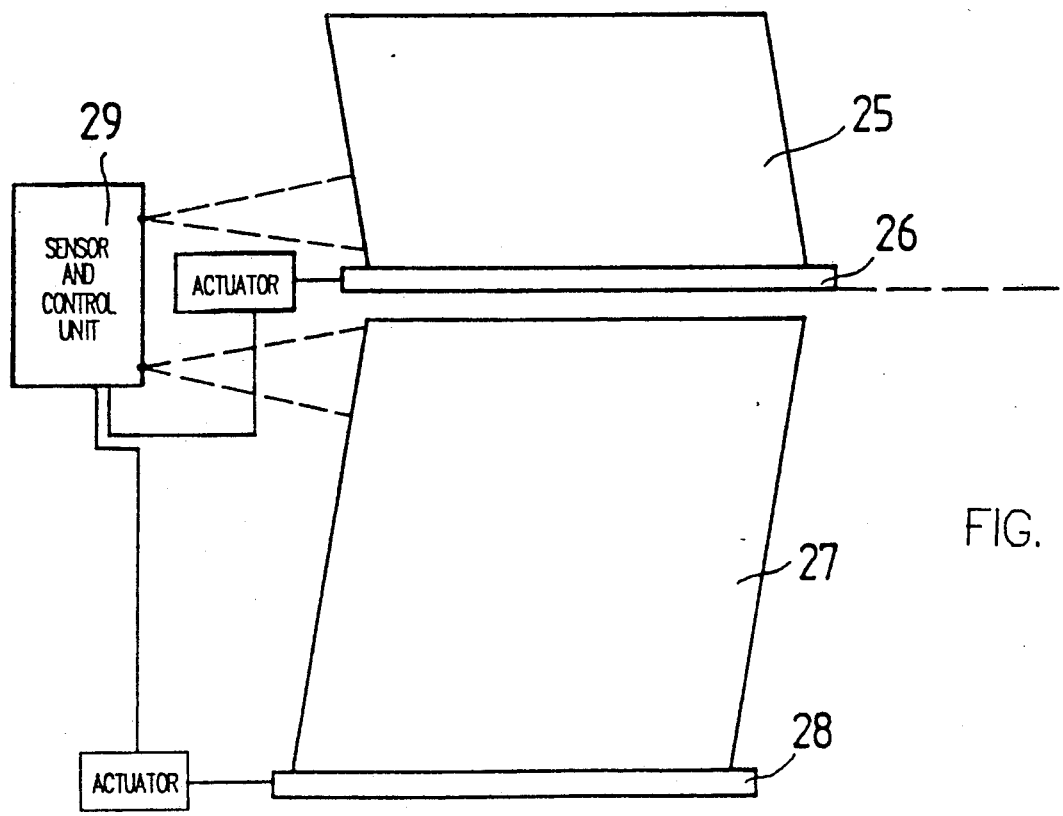

FIGS. 4 and 5 schematically illustrate an example of the use of an optical distance measuring device according to the present invention in the context of a printing machine. Such a device can preferably have an auxiliary paper stack 25 positioned on an auxiliary stacking device 26, whereby, preferably, the respective uppermost paper sheets of the auxiliary stack are taken from the stack and fed to the printing machine. Below the auxiliary stack 25 there is shown a new paper stack 27 which is positioned on a stack lifting device 28. A sensor and control unit 29 preferably contains the components as described in FIGS. 1 to 3. In reference to FIGS. 4 and 5, the measuring values D are processed into control signals which can then be transmitted to actuators 32, 33 via the lines 30, 31, wherein the actuator 32 can be assigned to the auxiliary stack device 26 and the actuator 33 can be assigned to the stack lifting device 28.

FIG. 4 essentially shows, in an exaggerated manner, that the auxiliary stack 25 and the new paper stack 27 can each be slanted in different directions. Thus, after the measuring signals are processed, the two stacks 25, 27, as shown in FIG. 5, can be laterally aligned in such a way that the bottom sheet of the auxiliary stack 25 and the top sheet of the new paper stack 27 are aligned with one another. In this manner, the placement of the auxiliary stack 25 on the new paper stack 27, which has been aligned with stack 25, and the continued processing of the uppermost paper sheets by the printing machine, essentially will not result in any sudden lateral offset in the plane of the stack region between the two stacks. Any type of lateral offset could strain the control and regulation of the printing machine.

In general, the invention relates to a method and a device for optical measurement of the distance of two objects from each other by means of optical triangulation, whereby the relative distance between two objects is correctly detected in an optical way, such as is required, for example, for the detection and display of the position difference of two objects, such as paper stacks in a printing machine.

In summary, one aspect of the invention resides broadly in a method for the optical measurement of the distance of objects, and in particular the distance of two objects from each other (difference-distance) by means of optical triangulation with two separate light transmitters which are triggered in periodic alternation to irradiate the objects to be measured, whereby the transmitter light beams form a triangulation plane with the respective receiver axis (influx mirror 45°), characterized in that through further optical means, preferably plane mirrors, the received light beams are imaged on one and the same position-sensitive photo-receiver arrangement in the same periodic alternation, and that the position of the focal point of the image on the receiver arrangement represents a measure for the distance of the respective object from the device and the position differences of both images represent a measure for the relative distance of the objects, the relative distance being determined by the use of only one single analogue electronic measuring channel in periodic alternation suppressing synchronism and drifting errors.

Yet another feature of the invention resides broadly in a method, characterized in that an accurate measurement of the absolute distance of an object is related to a difference-distance measurement between the object in question and a second object, the distance of which being precisely known and serving as a reference value.

A further feature of the invention resides broadly in a device for carrying out the method, characterized in that as transmitters there are used LED, IRED or semiconductor Lasers and as receiver arrangement there are used double photo diodes, position-sensitive receivers (PSD) or CCD-lines, which generate a difference signal corresponding to distance, said signal being lead to actuators which adjust the objects to be joined in their position to each other, so that both surfaces of contact are in conformance with each other.

A still further feature of the invention resides broadly in a device, characterized in that, for evaluation, a microprocessor control is used, by which microprocessor control individual remnant errors in the device are compensated in a learning process.

Another additional feature of the invention resides broadly in a device, characterized in that the objects to be joined are an auxiliary stack and a new paper stack in a printing machine, to which respective actuators are assigned through which the lateral positions of the stacks relative to each other can be changed, and that the difference-distance signal, for the joining of both stacks, control both actuators via a control unit in such a way that the bottom surface of the auxiliary stack is in conformance with the top surface of the new paper stack.

Some examples of distance measuring systems using optical components can be found in the following U.S. Pats.: U.S. Pat. No. 4,336,997, entitled "Change of Distance Measuring Apparatus"; U.S. Pat. No. 4,764,015 to Bieringer and Ringlien, entitled "Method and Apparatus for Non-Contact Spatial Measurement"; U.S. Pat. No. 4,701,049 to Beckman and Oomea, entitled "Measuring System Employing a Measuring Method Based on the Triangulation Principle for the Non-Contact Measurement of a Distance from the Surface of a Contoured Object to a Reference Level"; U.S. Pat. No. 4,611,911 to Kadomatsu, entitled "Electro-Optical Distance Measuring Device"; U.S. Pat. No. 4,373,816 to Laib, entitled "Scanning Beam Optical Position Determining Apparatus and Method"; U.S. Pat. No. 5,054,912 to Kuchel, entitled "Optical Distance-Measuring Device"; U.S. Pat. No. 4,560,270 to Wiklund and Hertzman, entitled "Device Included in a Distance Meter System"; and U.S. Pat. No. 4,397,548 to McCormack, entitled "Distance Measuring System".

Examples of printing presses in general, and some additional components of printing presses can be found in the following patents: U.S. Pat. No. 5,081,926 to Rodi, entitled "Method and Apparatus for the Rapid establishment of an ink zone profile in an Offset Printing Press"; U.S. Pat. No. 5,016,529 to Jahn, entitled "Sheet-Fed Rotary Printing Press for Multi-Color Printing"; U.S. Pat. No. 4,621,576 to Wirz, entitled "Sheet-Fed Rotary Printing Presses for Single Side Printing or First Form and Perfection Printing"; and U.S. Pat. No. 4,697,804 to Pollich, entitled "Sheet Feeder for Rotary Printing Machines".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publication, into the claims during prosecution as further limitations in the claims to patentably distinguish any amended claims from any applied prior art.

The appended drawings in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Method for aligning paper stacks in a printing press, the printing press comprising means for holding a first stack of paper for supplying sheets of paper to the printing press, means for holding at least one additional stack of paper for replacing the first stack of paper, and means for moving the at least one additional stack of paper relative to the first stack of paper to align the at least one additional stack of paper with the first stack of paper, said method comprising the steps of:
   directing a beam onto each of the first stack of paper and the at least one additional stack of paper;
   reflecting said beam off of each of the first stack of paper and the at least one additional stack of paper;
   directing said reflected beam from each of the first stack of paper and the at least one additional stack of paper onto a single detector means, said detector means comprising a position sensitive receiver for detecting said reflected beams;
   detecting each of said reflected beams with said detector means;
   generating a signal with said detector means for each of said reflected beams, said signals for each of said reflected beams corresponding to the relative position of each of the first stack of paper and the at least one additional stack of paper; and
   moving said at least one additional stack of paper with said means for moving in response to said signals to align said at least one additional stack of paper with said first stack of paper.

2. The method for aligning paper stacks according to claim 1, wherein:
   said directing said beam onto each of a first stack of paper and at least one additional stack of paper comprises directing an individual beam onto each of the first stack of paper and the at least one additional stack of paper, each individual beam originating from a separate beam source; and
   said process further comprises the steps of:
   alternately triggering each of said individual beam sources to alternately direct an individual beam at each of the first and the at least one additional stack of paper;
   alternately receiving said reflected light beams from each of the first and the at least one additional stack of paper on the detector means;
   alternately generating said signals corresponding to the distance to each of the first and the at least one additional stack of paper;
   alternately receiving said alternating generated signals from said detector means in signal processing means; and
   converting said alternating signals to individual distance measurements for each of the first and the at least one additional stack of paper.

3. The method for aligning paper stacks according to claim 2, wherein:
   said beams alternately impinge said detector means at locations on said detector means; and
   said detecting comprises detecting said locations of said impinging on said detector means;
   said locations of said impinging of said beams on said detector means corresponding to the distance between the detector means and the paper stack reflecting said beam to said locations; and
   said location of said reflected beam from the first stack of paper relative to said location of said beam from the at least one additional stack of paper corresponding to a relative position of the first stack of paper relative to the at least one additional stack of paper.

4. The method for aligning paper stacks according to claim 3, wherein each of said beams comprises a light beam and said directing said reflected light beam comprises:
passing said light beam through at least one lens to focus said light beam; and
changing the direction of said light beam by reflecting said light beam off of at least one mirror to impinge said light beam on the detector means.

5. The method for aligning paper stacks according to claim 4, wherein:
said source comprises one of:
light emitting diodes,
infra-red emitting diodes, and
semi-conductor lasers;
said position sensitive receiver comprises one of:
double photo-diodes,
position sensitive receivers, and
charge coupled device lines;
said signal processing apparatus comprises means for evaluation of said alternating generated signals corresponding to distance.

6. The method for aligning paper stacks according to claim 5, wherein said signal processing apparatus comprises a microprocessor for evaluation of said alternating generated signals; and
said method further comprises the steps of running the microprocessor through a learning program to compensate for operation errors in the apparatus.

7. The method for aligning paper stacks according to claim 3, wherein:
the first stack of paper is in a first location in the printing press;
the impinging location on the detector of said beam reflected from the first stack of paper comprises a reference location; and
the at least one additional stack of paper being moved in response to said alternating generated signals until said beam reflected off of the at least one additional stack of paper impinges on the detector at substantially the same location as the reference location for the first stack of paper.

8. Method for measuring the distance of at least a first and a second paper stack in a printing press and aligning the at least a first and a second paper stack, each of the at least a first and a second paper stack having at least a top sheet of paper and a bottom sheet of paper, said first paper stack for supplying sheets of paper to the printing press and at least the second paper stack being for replacing the first paper stack upon the fist paper stack being depleted of sheets of paper, the second stack of paper being movable by moving means to align the top sheet of the second paper stack with the bottom sheet of the first paper stack, said method comprising the steps of:
directing a light beam onto each of the at least a first and a second paper stack;
reflecting said light beam off of each of the at least a first and a second paper stack;
directing said reflected light beam from each of the at least a first and a second paper stack onto a single detector means, said detector means comprising a position sensitive receiver for detecting said reflected light beams;
detecting each of said reflected light beams with said detector means;

generating a signal with said detector means for each of said reflected light beams, said signal for each of said reflected light beams corresponding to the distance of the at least a first and a second paper stack from the detector means; and
moving said second paper stack with said moving means in response to said signals to align the top sheet of the second paper stack with the bottom sheet of the first paper stack.

9. The method for measuring distance according to claim 8, wherein:
said directing said light beam onto each of the at least a first and a second paper stack comprises directing an individual light beam onto each of the at least a first and a second paper stack, each individual light beam originating from a separate light source; and
said process further comprises the steps of:
alternately triggering each of the individual light sources to alternately direct an individual light beam at each of the at least a first and a second paper stack;
alternately receiving said reflected light beams from each of the at least a first and a second paper stack on the detector means;
alternately generating said signals corresponding to the distance to each of the at least a first and a second paper stacks;
alternately receiving said alternating generated signals from said detector means in signal processing means; and
converting said alternating signals to individual distance measurements for each of the at least a first and a second paper stack in said signal processing means.

10. The method for measuring distance according to claim 9, wherein:
said light beams alternately impinge said detector means at locations on said detector means; and
said detecting comprises detecting said locations of said impinging on said detector means;
said locations of said impinging of said light beams on said detector means corresponding to the distance between the detector means and the paper stacks reflecting said light beam to said locations; and
said location of a light beam from one of the at least a first and a second paper stacks relative to said location of a light beam from a other of the at least a first and a second paper stacks corresponding to a relative position of the at least a first and a second paper stacks relative to one another.

11. The method for measuring distance according to claim 10, wherein said directing said reflected light beam from each paper stack comprises:
passing said light beam through at least one lens to focus said light beam; and
changing the direction of said light beam by reflecting said light beam off of at least one mirror to impinge said light beam on the detector means.

12. The method for measuring distance according to claim 11, wherein:
said light source comprises one of:
light emitting diodes,
infra-red emitting diodes, and
semi-conductor lasers;
said position sensitive receiver comprises one of:
double photo-diodes,
position sensitive receivers, and
charge coupled device lines;

said signal processing apparatus comprises means for evaluation of said alternating generated signals corresponding to distance.

13. The method for measuring distance according to claim 12, wherein said signal processing apparatus comprises a microprocessor for evaluation of said alternating generated signals; and said method further comprises the steps of running the microprocessor through a learning program to compensate for operation errors in the apparatus.

14. Apparatus for measuring the distance between and aligning at least two paper stacks by optical triangulation, a first of the paper stacks being for supplying paper to the printing press, and another of the paper stacks being a reserve paper supply, said apparatus comprising:

means for irradiating each of the at least two paper stacks with a light beam, said light beam for irradiating each of the at least two paper stacks being reflected off of each of the at least two paper stacks;

a single detector means for detecting said reflected light beam from each of the at least two paper stacks, said detector means comprising a position sensitive receiver arrangement for detecting each of said reflected light beams;

means for directing each of said reflected light beams from each of the at least two paper stacks onto said single detector means;

said single detector means comprising means for generating a signal for each of said reflected light beams, said signal for each of said reflected light beams being for corresponding to the distance of each of the at least two paper stacks from the detector means; and means for aligning the at least two paper stacks in response to said generated signals.

15. The apparatus for measuring distance according to claim 14, wherein:

each of said paper stacks has a top sheet and a bottom sheet, and said printing press removes a top sheet of the first paper supply stack; and said means for aligning comprising actuators for moving the reserve supply paper stack so that the top sheet of the reserve supply paper stack is aligned with the bottom sheet of the first paper supply stack.

16. The apparatus for measuring distance according to claim 15, wherein:

said means for irradiating comprises an individual light source for irradiating each of the at least two paper stacks; and said apparatus further comprises:

means for alternately triggering each of the individual light sources to alternately irradiate each of the at least two paper stacks;

said detector being for alternately receiving said reflected light beams and alternately generating signals corresponding to the distance to each of the at least two paper stacks;

means for alternately receiving said generated alternating signals from said detector means; and means for converting said alternating signals to individual distance measurements for each of the at least two paper stacks.

17. The apparatus for measuring distance according to claim 16, wherein:

said light beams alternately impinge said detector means at locations on said detector means;

said locations of said impinging of said light beams on said detector means corresponding to the distance between the detector means and the paper stacks reflecting said light beam to said locations; and said location of one light beam from one of the at least two paper stacks relative to said location of another light beam from another of the at least two paper stacks corresponding to a relative position of the at least two paper stacks relative to one another.

18. The apparatus for measuring distance according to claim 17, wherein:

said means for directing said reflected light beams comprises an arrangement of lenses and mirrors for focusing and directing each of said reflected light beams;

said light source comprises one of:
light emitting diodes,
infra-red emitting diodes, and
semi-conductor lasers;

said position sensitive receiver comprises one of:
double photo-diodes,
position sensitive receivers, and
charge coupled device lines; and said apparatus further comprises signal processing apparatus for evaluation of said alternating generated signals corresponding to distance.

19. The apparatus for measuring distance according to claim 18, further including a microprocessor for evaluation of said generated signals, said microprocessor comprising means for compensating for errors in the apparatus by running a learning program during start-up of the apparatus.

* * * * *

UNITED STATES PATENT AND TRADEMARK OFFICE
CERTIFICATE OF CORRECTION

PATENT NO. : 5,256,884
DATED : October 26, 1993
INVENTOR(S) : Helmut BUCK and Ludwig BERGANN It is certified that error appears in the above-indentified patent and that said Letters Patent is hereby corrected as shown below:

In column 9, line 52, Claim 8, after the second occurrence of 'the', please delete "fist" and insert --first--.

In column 10, line 47, Claim 10, after 'from', delete "a other" and insert --another--.

Signed and Sealed this

Thirty-first Day of May, 1994

Attest:

BRUCE LEHMAN

*Attesting Officer*  *Commissioner of Patents and Trademarks*